US006979121B2

(12) United States Patent
Chang et al.

(10) Patent No.: US 6,979,121 B2
(45) Date of Patent: Dec. 27, 2005

(54) TEMPERATURE PROBE AND THERMOMETER HAVING THE SAME

(75) Inventors: Hsiao Yi Chang, Taichung Hsien (TW); Chu Yih Yu, Taipei Hsien (TW)

(73) Assignee: Mesure Technology, Co., Ltd., Taipei Hsien (TW)

( * ) Notice: Subject to any disclaimer, the term of this patent is extended or adjusted under 35 U.S.C. 154(b) by 0 days.

(21) Appl. No.: 10/780,933

(22) Filed: Feb. 17, 2004

(65) Prior Publication Data

US 2004/0161017 A1 Aug. 19, 2004

Related U.S. Application Data

(63) Continuation-in-part of application No. 10/274,220, filed on Oct. 18, 2002, now abandoned.

(51) Int. Cl.[7] ............................ G01K 1/00; G01K 7/00
(52) U.S. Cl. ...................... 374/208; 374/163; 374/185; 600/474; 600/549
(58) Field of Search ............................... 374/163, 208, 374/170; 600/474, 549

(56) References Cited

U.S. PATENT DOCUMENTS

| | | | | |
|---|---|---|---|---|
| 2,588,014 A | | 3/1952 | Knudsen | 374/185 |
| 2,753,714 A | | 7/1956 | Perkins et al. | 374/185 |
| 2,818,482 A | | 12/1957 | Bennett | 374/208 |
| 3,535,935 A | | 10/1970 | Raudszus | 374/185 |
| 3,592,059 A | * | 7/1971 | Chilton | 374/165 |
| 3,681,993 A | | 8/1972 | Campton et al. | 73/362 AR |
| 3,754,201 A | * | 8/1973 | Adams | 338/28 |
| 3,832,669 A | * | 8/1974 | Mueller et al. | 338/28 |
| 3,915,003 A | * | 10/1975 | Adams | 374/164 |
| 4,183,248 A | | 1/1980 | West | 73/362 |
| 4,603,026 A | * | 7/1986 | Martin | 264/272.18 |
| 4,666,656 A | | 5/1987 | Bertrand | 376/147 |
| 4,688,949 A | | 8/1987 | Hatakenaka | 374/183 |
| 4,718,774 A | * | 1/1988 | Slough | 374/7 |
| 4,929,092 A | | 5/1990 | Tagushi et al. | 374/183 |
| 5,013,161 A | | 5/1991 | Zaragoza et al. | 374/208 |
| 5,367,282 A | | 11/1994 | Clem | 338/22 R |
| 5,632,555 A | | 5/1997 | Gregory et al. | 374/102 |
| 5,749,656 A | | 5/1998 | Boehm et al. | 374/185 |
| 6,068,399 A | * | 5/2000 | Tseng | 374/163 |
| 6,419,388 B2 | | 7/2002 | Lee | 374/208 |
| 6,437,679 B1 | | 8/2002 | Roques | 338/25 |
| 6,603,296 B2 | * | 8/2003 | Conti et al. | 324/71.4 |
| 6,676,290 B1 | * | 1/2004 | Lu | 374/163 |
| 6,854,880 B2 | * | 2/2005 | Hsieh | 374/163 |
| 2003/0198278 A1 | * | 10/2003 | Yu | 374/208 |

* cited by examiner

*Primary Examiner*—Gail Verbitsky
(74) *Attorney, Agent, or Firm*—Thomas, Kayden, Horstemeyer & Risley

(57) ABSTRACT

A temperature probe for use in a medical thermometer. The temperature probe includes a probe body and a hollow tip member secured to the probe body. The hollow tip member further has an outer wall as a thermal contact surface, an inner wall inside the outer wall, a thermal isolation space formed between the outer wall and the inner wall, and a hollow cavity surrounded by the inner wall. A thermal sensor is disposed within the hollow tip member so as to sense the temperature of the thermal contact surface and produce a temperature signal. A set of transmission wires is connected to the thermal sensor to pass the temperature signal.

4 Claims, 7 Drawing Sheets

100

TEMPERATURE PROBE AND THERMOMETER HAVING THE SAME

CROSS REFERENCE TO RELATED APPLICATIONS

This application is a Continuation-In-Part of U.S. patent application Ser. No. 10/274,220, filed Oct. 18, 2002, now abandoned.

BACKGROUND OF THE INVENTION

1. Field of the Invention

The invention relates to the field of thermometers. More particularly, the invention relates to the field of medical thermometers employing a temperature probe for measurement of a patient's temperature, although it is equally applicable to other temperature measurement fields.

2. Description of the Related Art

As disclosed in U.S. Pat. No. 4,183,248, electronic thermometers offer a great number of advantages over conventional glass and mercury thermometer for use in the health care field. Among the advantages of electronic thermometers are the elimination of sterilization procedure for glass thermometers, a digital temperature display to eliminate temperature reading errors, and higher accuracy and resolution, e.g., 1/10 degree Fahrenheit, being easily attainable with proper circuit design and calibration.

However, the major concern with regard to the electronic thermometers lays on their slow time response. This problem is incurred mainly because a thermometer probe represents a certain amount of mass and heat capacity, and when inserted from room temperature into a body cavity it cannot change temperature instantaneously, but instead approaches its final temperature more or less exponentially. It often requires over three minutes lag time before a final stabilized temperature is measured.

For the purpose of time response reduction, prior art techniques have included using a thermometer probe that has a metal tip for higher heat conductance. Additionally, U.S. Pat. No. 4,183,248 discloses an electronic thermometer which comprises two temperature sensors and a heater coil. The heater coil is used to thermally isolate the tip from the remainder of the probe, which eliminates long thermal time delays. The patent claims that a remarkable improvement of about 16 seconds measurement time is accomplished. U.S. Pat. No. 5,632,555 employs a heater to bring the probe tip to a specific temperature before it is applied to a patient. A microprocessor using a prediction algorithm is provided to determine the final temperature. This patent claims a measurement time of approximately 4 to 15 seconds. Nevertheless, these thermometers have some drawbacks such as high circuit complexity, high energy consumption and high production cost, since they have a built-in heater and/or expensive microprocessor.

To overcomes the aforementioned problems, U.S. Pat. No. 6,419,388 discloses an electronic medical thermometer which comprises a probe body having a metal tip to contact with a patient's tissue. The metal tip has a conical nose portion. The tip includes a temperature sensor mounted within the conical nose portion. The sensor thus generates a signal representing the temperature of the metal tip. Notably, the ratio of the metal tip's length to the metal tip's diameter is 3:1 at least. U.S. Pat. No. 6,419,388 claims that such a metal tip provides a small thermal capacity and a function like thermal isolation. This results in a measurement time of 20 to 30 seconds without a heater. However, transmission wires for the temperature signal, as shown in U.S. Pat. No. 6,419,388, are not fixed within the metal tip and exposed to air or gas such that the wires form a heat flow path which cannot be neglected. As a result, this takes the considerable measurement time.

SUMMARY OF THE INVENTION

It is an object of the present invention to provide a fast response temperature probe and an electronic thermometer having the same to overcome the disadvantages of the prior art.

The present invention discloses that the temperature probe includes a probe body and a hollow tip member secured to the probe body. The hollow tip member further has an outer wall as a thermal contact surface, an inner wall inside the outer wall, a thermal isolation space formed between the outer wall and the inner wall, and a hollow cavity surrounded by the inner wall. A thermal sensor is disposed within the hollow tip member so as to sense the temperature of the thermal contact surface and produce a temperature signal. A set of transmission wires is connected to the thermal sensor to pass the temperature signal.

An embodiment of the present invention discloses that the temperature probe precludes the unwanted heat flow from transmission wires toward the hollow cavity, or the transmission wires and thermal sensor are designed to reach an equilibrium temperature immediately. To approach the equilibrium temperature instantly, the thermal sensor or at least a portion of transmission wires is preferably disposed within the thermal isolation space formed between the outer wall and the inner wall.

In close contact with flesh in a body cavity, the thermal contact surface serves as a heater such that the thermal sensor or transmission wires disposed within the thermal isolation space come to the equilibrium temperature rapidly. Thus, the measurement time is dramatically reduced.

According to another aspect of the invention, a thermometer with a temperature probe is disclosed. The thermometer includes an integrated and inseparable body member made up of a probe portion and a display portion.

According yet another aspect of the invention, a thermometer with a temperature probe includes a separable body member made up of a probe body and a display body.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
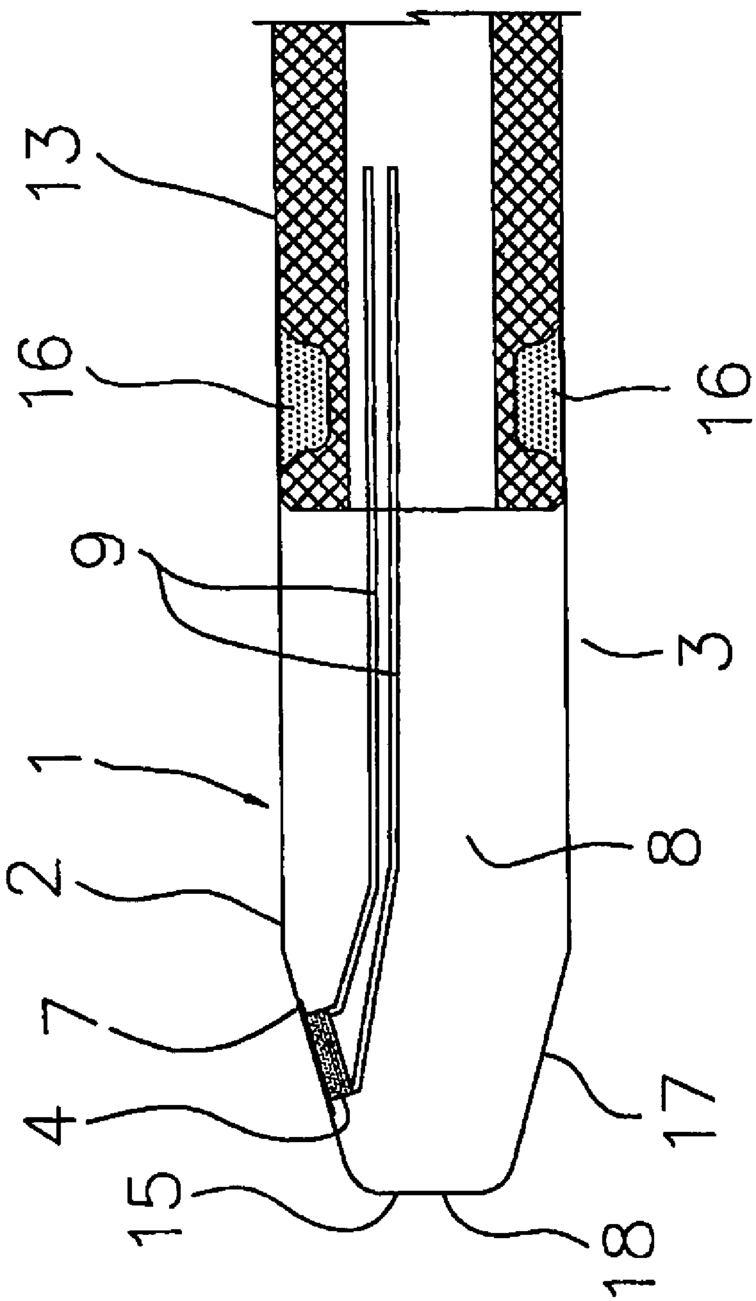
FIG. 1 is a cross-sectional view of a conventional thermometer.

FIG. 1 illustrates a medical thermometer 1 according to a prior art. The thermometer 1 includes a metal tip 2 and a plastic probe body 13. The metal tip 2 is formed as a tubular part and attached to the plastic probe body 13 with glue 16. The metal tip 2 is made of thin metal and closed at the end 15. The end 15 has a conical portion 17 which is closed by a flat or rounded end portion 18. A temperature sensor 4 is mounted on the inner surface of the conical portion 17 by adhesive with good thermal conductivity. The remainder of the metal tip 2 is free from adhesive and preferably filled with air. Wires 9 connect the temperature sensor 4 to a circuit adapted to calculate and display the temperature measured by the sensor 4. The metal tip 2 also includes a contact surface 3 surrounding a hollow cavity 8. The contact surface 3 is brought in contact with flesh of a patient.

Figure 2:
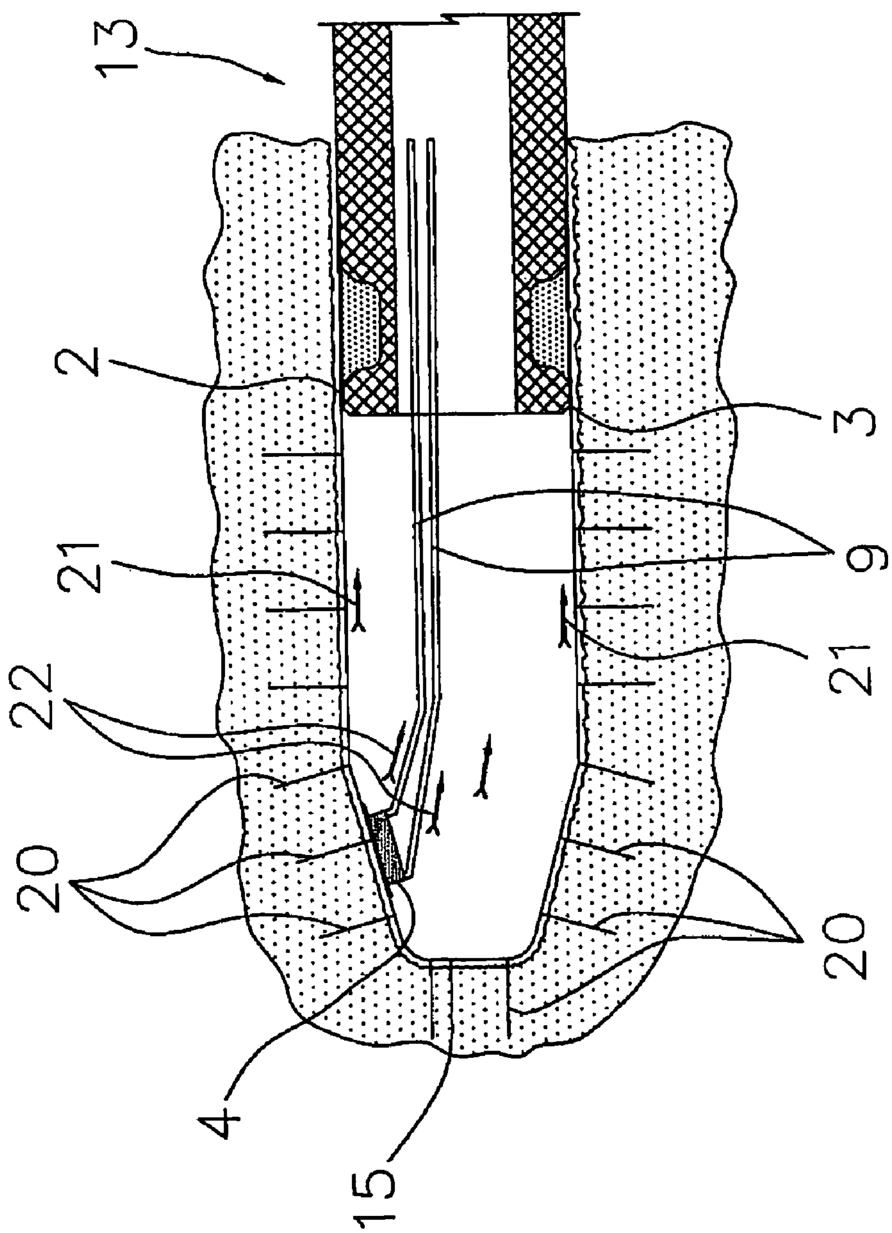
FIG. 2 is a diagram illustrating heat flows in the conventional thermometer of FIG. 1.

Referring to FIG. 2, the heat flow of the probe body 13 near the metal tip 2 is illustrated. Heat from the patient's flesh is transferred to the metal tip 2 as indicated by arrows 20. Meanwhile, heat flows through the metal tip 2 as shown by arrows 21 and also through the wires 9 as shown by arrows 22. The metal tip 2 is in contact with the patient's flesh over its entire length, the flesh surrounding the metal tip 2 functions like a distributing heater. Therefore, the heat flow 21 is very small and can be neglected. The metal tip 2 further serves as a thermal isolation between the end 15 of the metal tip 2 and the remaining part of the probe body 13.

The wires 9 without any treatment are exposed to the air within the metal tip 2, thus causing a considerable heat flow 22 that cannot be neglected. However, the prior art ignores this heat flow path intentionally. As a result, the thermometer 1 still takes a measurement time up to 30 seconds.

First Embodiment

Figure 3:
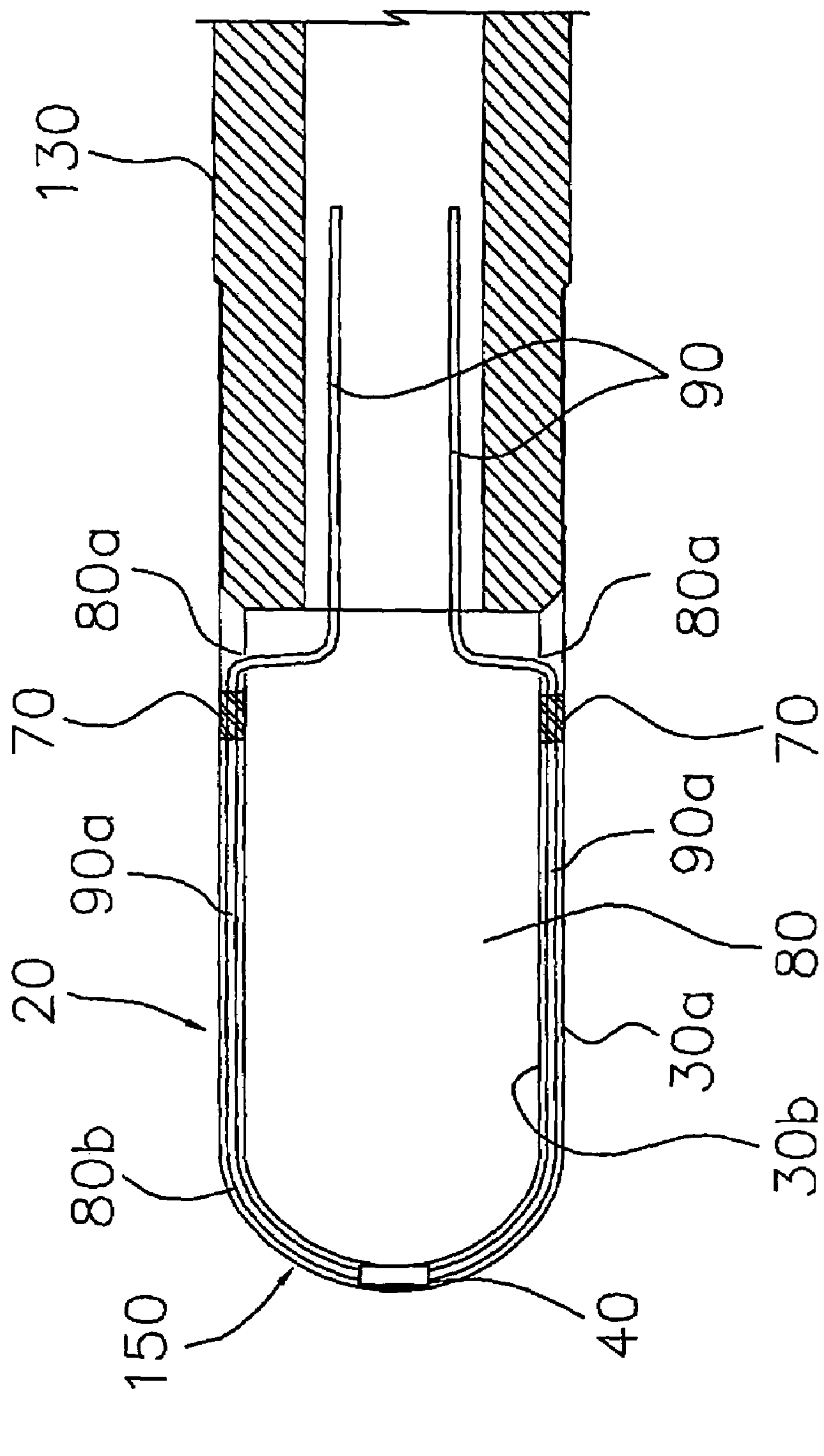
FIG. 3 is a cross-sectional view of a first embodiment according to the invention.

Referring to FIG. 3, a temperature probe 100 of the invention is illustrated. The temperature probe 100 includes a probe body 130 and a hollow tip member 20 secured to the probe body 130. The hollow tip member 20 has an outer wall **30*a* as a thermal contact surface 30 and an inner wall 30*b* inside the outer wall 30*a*. A thermal isolation space 80*b* is formed between the outer wall 30*a* and the inner wall 30*b*. A hollow cavity 80 is surrounded by the inner wall 30*b*. A thermal sensor 40 is disposed within the hollow tip member 20. For example, the thermal sensor 40 is disposed within the thermal isolation space 80*b*. Preferably, the thermal sensor 40 is placed at the front end 150 of the hollow tip member 20 and mounted on the inside of the outer wall 30*a*. The thermal sensor 40 senses the temperature of the thermal contact surface and produces a temperature signal. A set of transmission wires 90 is connected to the thermal sensor to pass the temperature signal. Preferably, at least a portion of the set of transmission wires 90*a* is disposed within the thermal isolation space 80*b*, such that allowing the thermal sensor 40 and the set of transmission wires 90 to reach thermal equilibrium quickly as shown in FIG. 3**.

Second Embodiment

Figure 4:
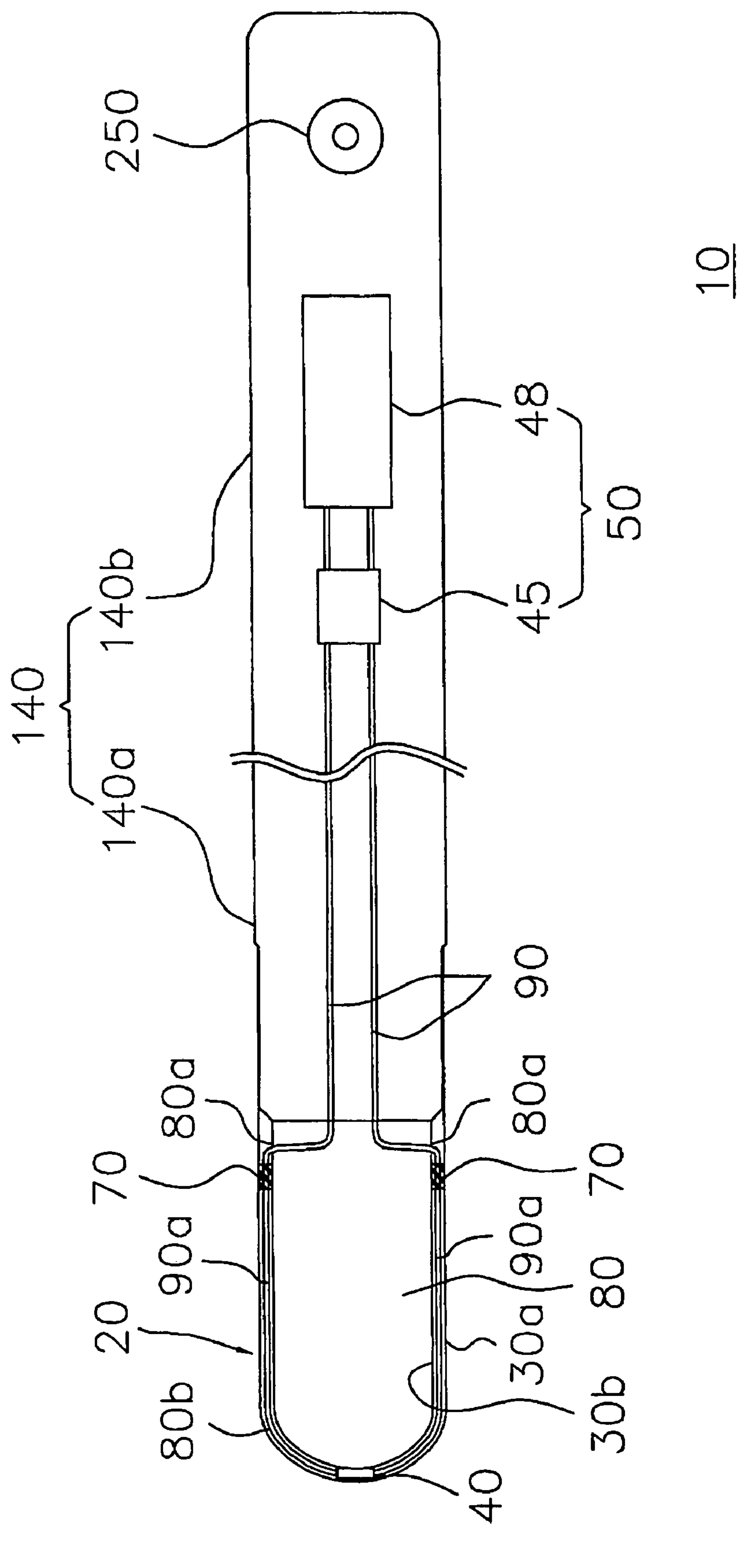
FIG. 4 is a cross-sectional view of a second embodiment according to the invention.

FIG. 4 is a thermometer 10 with a temperature probe according to the invention. The thermometer 10 includes an integrated and inseparable body member 140 plus a hollow tip member 20. In FIG. 4 the hollow tip member 20 is shown in an enlarged view for detailed description. The body member 140 is comprised of a probe portion **140*a* and a display portion 140*b*. The hollow tip member 20 is secured to the probe portion 140*a*. The hollow tip member 20 has an outer wall 30*a* as a thermal contact surface 30 and an inner wall 30*b* inside the outer wall 30*a*. A thermal isolation space 80*b* is formed between the outer wall 30*a* and the inner wall 30*b*. A hollow cavity 80 is surrounded by the inner wall 30*b*. A thermal sensor 40 is disposed within the hollow tip member 20. The thermal sensor 40 senses the temperature of the thermal contact surface and produces a temperature signal. A set of transmission wires 90 is connected to the thermal sensor to pass the temperature signal. Preferably, at least a portion of the set of transmission wires 90*a* is disposed within the thermal isolation space 80*b***.

Display means 50 is mounted on the display portion **140*b*. A set of transmission wires 90 is provided to connect the thermal sensor 40 to the display means 50. The wires 90 transfers the temperature signal from the sensor 40 to the display means 50. As depicted, at least a portion of each wire is preferably bonded to the inside of the outer wall 30*a*. The display means 50 includes a display 48 and circuitry 45 coupled to the display 48. The circuitry 45 is connected to the transmission wires 90 to receive the temperature signal. It drives the display 48 to show a temperature corresponding to the received temperature signal. The thermometer 10 also comprises a switch 250 to turn on and off the display means 50**.

Third Embodiment

Figure 5:
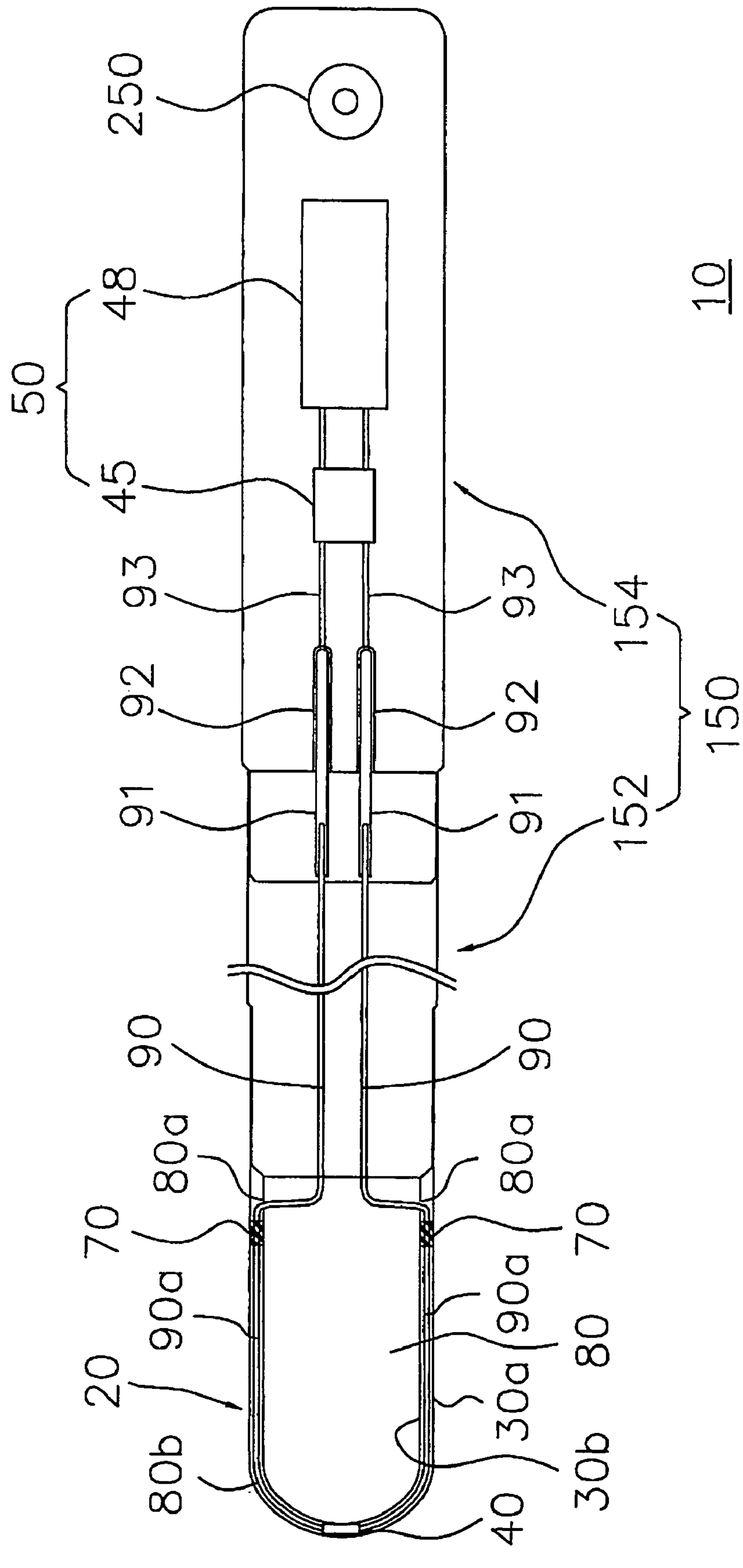
FIG. 5 is a cross-sectional view of a third embodiment according to the invention.

Turning now to FIG. 5, a thermometer 10 having a temperature probe is illustrated. The thermometer 10 includes a separable body member 150 and a hollow tip member 20. In FIG. 5 the hollow tip member 20 is shown in an enlarged view for detailed description. The body member 150 is made up of an independent probe body 152 and an independent display body 154. A hollow tip member 20 is secured to the probe body 152. The hollow tip member 20 has an outer wall **30*a* as a thermal contact surface 30 and an inner wall 30*b* inside the outer wall 30*a*. A thermal isolation space 80*b* is formed between the outer wall 30*a* and the inner wall 30*b*. A hollow cavity 80 is surrounded by the inner wall 30*b*. A thermal sensor 40 is disposed within the hollow tip member 20. The thermal sensor 40 senses the temperature of the thermal contact surface and produces a temperature signal. A set of transmission wires 90 is connected to the thermal sensor to pass the temperature signal. For example, at least a portion of the set of transmission wires 90*a* is disposed within the thermal isolation space 80*b*. As depicted, at least a portion of each wire 90*a* is preferably bonded to the inside of the outer wall 30*a***.

Furthermore, the independent probe body 152 has a first connector 91 and the independent display body 154 has a second connector 92. The first connector 91 is attached to the wires 90. The second connector 92 is provided to connect to the first connector 91. Preferably, the first connector 91 is a male connector and the second connector 92 is a female connector to mate with the male connector 91. Display means 50, mounted on the independent display body 154, includes a display 48 and circuitry 45 coupled to the display 48. In the display body 154, wires 93 connect the female connector 92 to the circuitry 45. The circuitry 45 is attached to the thermal sensor 40 through the wires and the connectors to receive the temperature signal. It drives the display 48 to show a temperature corresponding to the received temperature signal. The thermometer 10 also comprises a switch 250 to turn on and off the display means 50.

Figure 7:
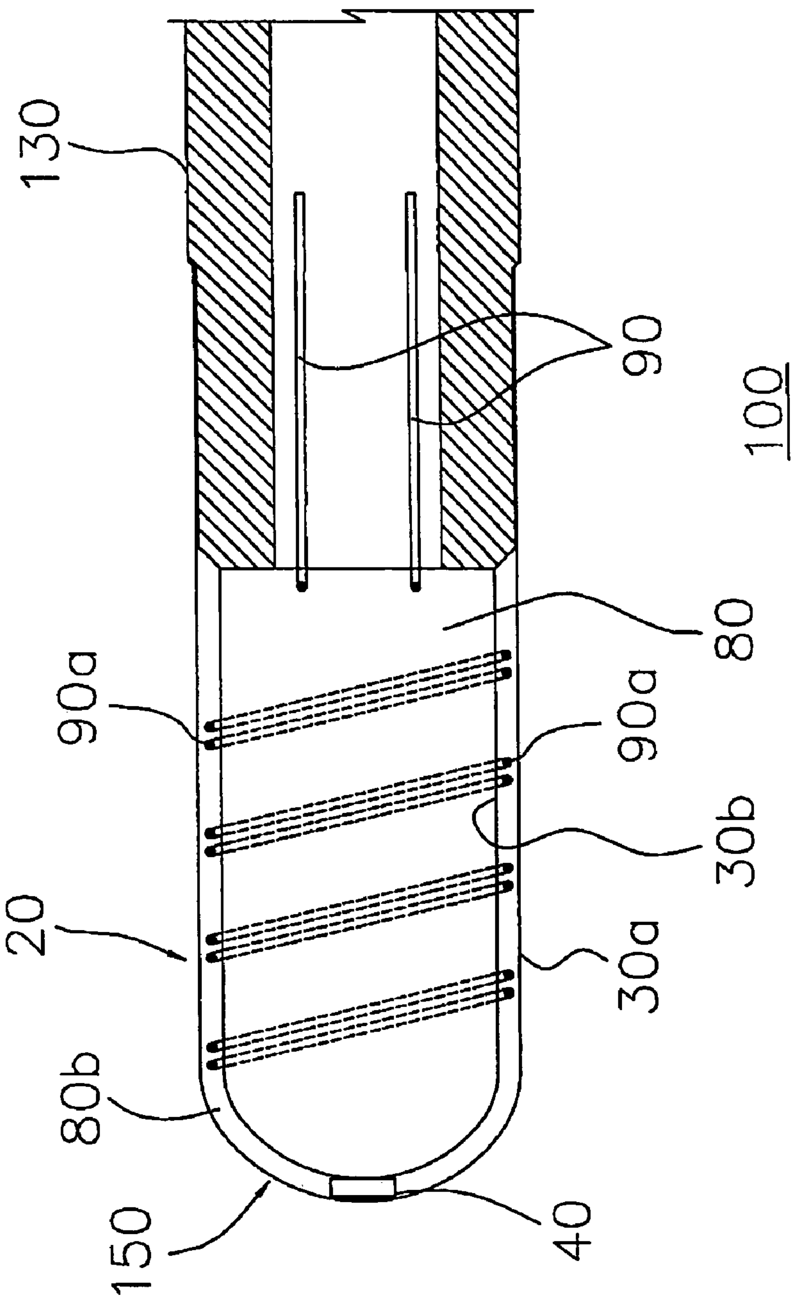
FIG. 7 is a diagram illustrating the wire connection in a hollow metal tip of the invention.

In the above-described embodiments, the outer wall **30*a* of the hollow tip member 20 is preferably made of metal with high thermal conductivity, such as silver, platinum, or stainless steel. The inner wall 30*b* of the hollow tip member 20 is made of metal or thermal insulating material. Preferably, the hollow tip member 20 further includes a thermal insulating layer inside or outside the inner wall 30_b_. According to the embodiment, the thermal insulating material has a low thermal conductivity. The hollow tip member 20 is made in the form of a tubular shape, and it has a domed, hemispherical or hemiellipsoid shaped end. Additionally, the preferred thermal sensor 40 is a thermistor. The transmission wires 90 and the thermistor 40 are both adhered on the inside of the outer wall 30_a_ of the hollow tip member 20 with heat conductive glue. According to the embodiment, the glue is an insulating material with good thermal conductivity, e.g., epoxy resin. Moreover, the transmission wires 90 are made up of a pair of electrical lead wires. The inner wall 30_b_ has a hole 80_a_ for allowing the transmission wires 90 to be passed into the hollow cavity 80. The transmission wires 90 are mounted within the thermal isolation space 80_b_ near the hole 80_a_ of the inner wall 30_b_. To enhance the conductive effect, optionally, wires 90 are bonded to the inside of the outer wall 30_a_ in a spiral form as shown in FIG. 7**. In this way, the thermistor and the wires can reach thermal equilibrium very quickly.

Figure 6:
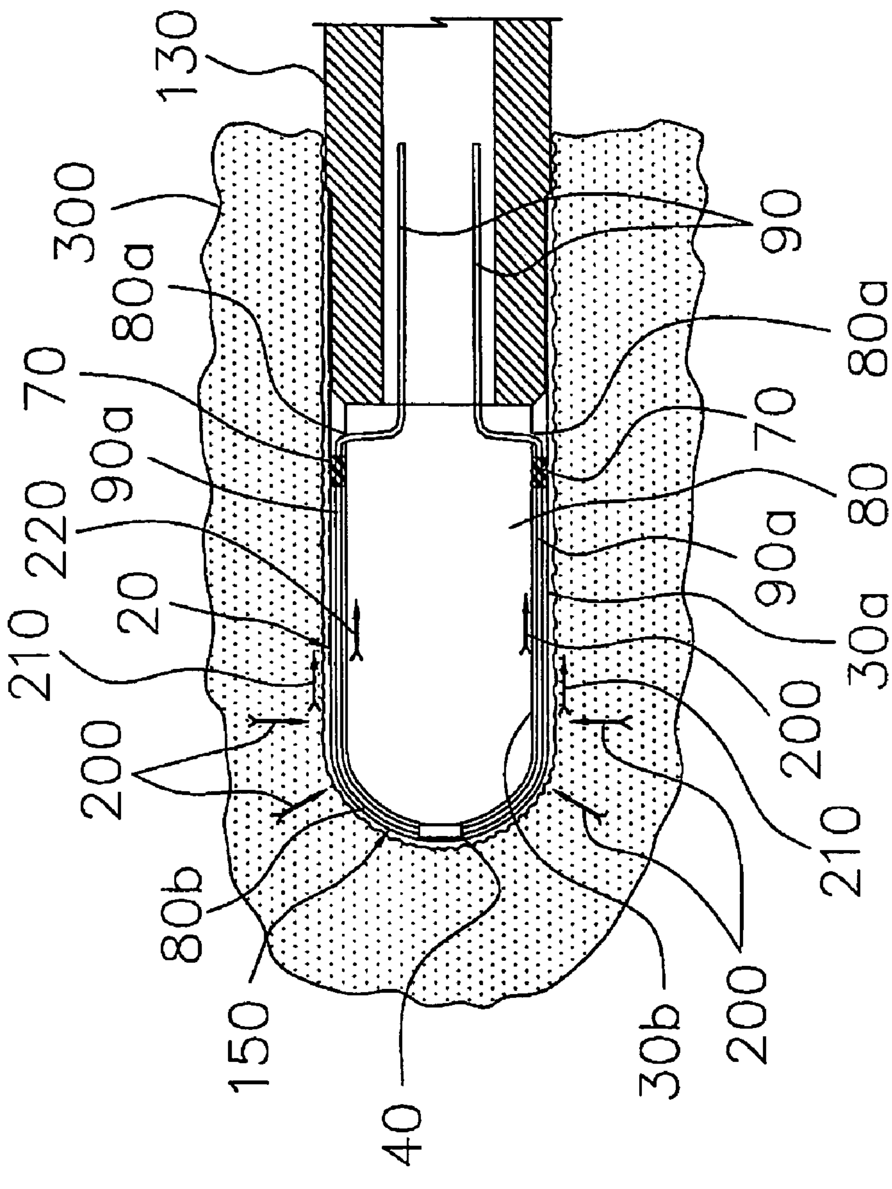
FIG. 6 is a diagram illustrating heat flows in the temperature probe of the invention.

Referring now to FIG. 6, the heat flow of the probe body 130 near the hollow tip member 20 is illustrated. Heat from the patient's flesh is transferred to the hollow tip member 20 as indicated by arrows 200. In the mean time, heat flows through the hollow tip member 20 as shown by arrows 210 and also through the wires 9 as shown by arrows 220. The hollow tip member 20 is in close contact with the patient's flesh over its entire member, the flesh surrounding the hollow tip member 20 functions like a distributing heater. Consequently, the heat flow 210 is relatively small and can be neglected.

A key feature of the above embodiments is that the thermal sensor or at least a portion of the transmission wires is disposed within the thermal isolation space between the outer wall and the inner wall. Furthermore, the inner wall isolates the hollow cavity. So heat from the thermal contact surface cannot direct flows into the hollow cavity such that a temperature gradient can be avoided or reduced. And an amount of mass and heat capacity of the thermal isolation space is smaller than the hollow cavity such that allowing the transmission wires to approach an equilibrium temperature quickly as the thermal contact surface is heated, so that the thermal sensor reaches thermal equilibrium more rapidly. Preferably, the transmission wires are entirely bonded to the inside of the outer wall in order to avoid exposure to the air within the thermal isolation space. In this regard, the unwanted heat flow is minimized. Surrounded by the patient's flesh, the thermal contact surface serves as a heater so the transmission wires come to the equilibrium temperature immediately. This effectively shortens the measurement time further.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A temperature probe comprising:

a probe body;

a hollow tip member secured to the probe body, wherein the hollow tip member comprises:

an outer wall as a thermal contact surface, an inner wall inside the outer wall, a thermal isolation space formed between the outer wall and the inner wall, and a hollow cavity surrounded by the inner wall;

a thermal sensor disposed within the hollow tip member for sensing the temperature of the thermal contact surface and producing a temperature signal; and a set of transmission wires connected to the thermal sensor for passing the temperature signal;

wherein the inner wall comprises a hole near the rear end of the hollow tip member for allowing the transmission wires to be passed into the hollow cavity wherein the transmission wires are mounted within the thermal isolation space near the hole of the inner wall.

2. The temperature probe as recited in claim 1 wherein the outer wall or inner wall of the hollow tip member is made of thermal conductivity metal.

3. The temperature probe as recited in claim 1 wherein the inner wall of the hollow tip member is made of thermal insulating material.

4. The temperature probe as recited in claim 1 wherein the transmission wires are bonded to the inside of the outer wall in a spiral form.

* * * * *